Sept. 26, 1961  E. SCHNITZER  3,001,611
DOUBLE-ACTING LOW BAND PASS SHOCK ABSORBER
Original Filed Sept. 30, 1957
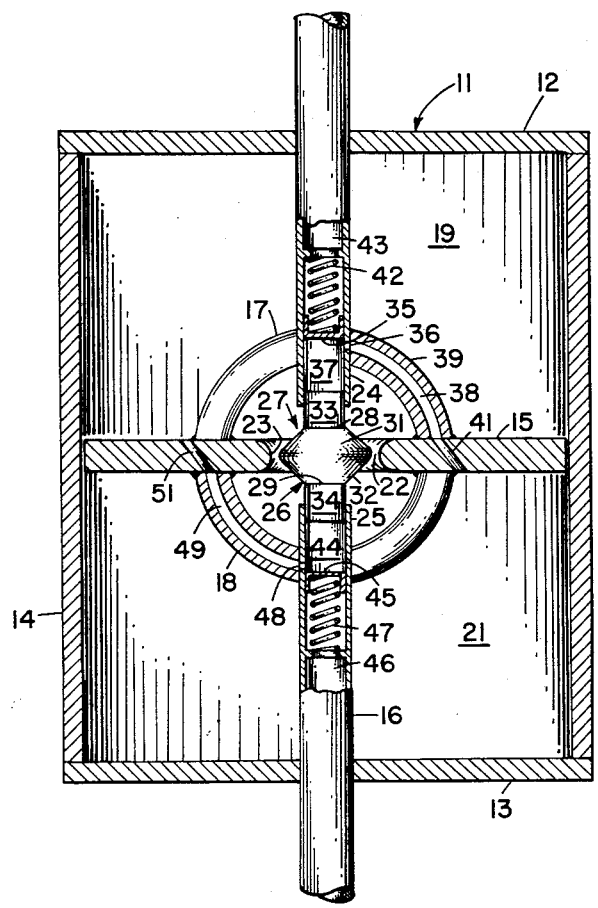
INVENTOR
EMANUEL SCHNITZER

United States Patent Office 3,001,611
Patented Sept. 26, 1961

3,001,611
DOUBLE-ACTING LOW BAND PASS
SHOCK ABSORBER
Emanuel Schnitzer, 926 19th St., Newport News, Va.
Original application Sept. 30, 1957, Ser. No. 687,308, now Patent No. 2,937,724, dated May 24, 1960. Divided and this application May 5, 1960, Ser. No. 27,231
6 Claims. (Cl. 188—96)
(Granted under Title 35, U.S. Code (1952), sec. 266)

The invention described herein may be manufactured and used by or for the Government of the United States of America for governmental purposes without the payment of any royalties thereon or therefor.

This invention relates to shock absorbers with particular reference to shock absorbers of the double acting type capable of selecting predetermined frequencies of disturbances for transmission between machine elements.

This application is a division of my copending application, Serial No. 687,308, filed September 30, 1957, now Patent No. 2,937,724, dated May 24, 1960 and which in turn was copending with my application Serial No. 585,128, filed May 15, 1956, now Patent No. 2,934,175, dated April 26, 1960. Patent No. 2,934,175 discloses a frequency selective shock absorber of simplified construction illustrative of the operative principles of a double acting shock absorber. In the present application there is shown a double acting shock absorber possessing certain advantages in construction and use, which will now be described.

An important object of the invention is to provide a shock absorber operative in opposite directions to select a range of frequencies for force transmittal.

Another object of the invention is to provide a double acting shock absorber which is yieldable at high loading frequencies or rates of increase of load.

Still another object of the invention is to provide a double acting shock absorber with means for recycling itself for high frequency oscillations while damping a low frequency load at the same time.

Another still further object of the invention relates to the provision of means permitting rapid recycling for low frequency vibrations which may be upsymmetrical in nature, as well as automatic high frequency recycling.

Another object of the invention, also, is the provision of a double acting shock absorber having a small number of moving parts.

Other objects and many of the attendant advantages of this invention will be readily appreciated as the same becomes better understood by reference to the following detailed description when considered in connection with the solitary figure of the accompanying drawing wherein is shown a longitudinal sectional view of the shock absorber.

Referring now to the drawing, a shock absorber incorporating a minimum number of moving parts and capable of rapid and automatic recycling action is shown. The main cylinder 11 is closed at its ends by plates 12 and 13, the cylindrical shell 14 extending between these end plates. A piston 15 attached to the hollow piston rod 16 by means of arcuate spiders 17 and 18 divides the main cylinder into two regions 19 and 21. A main centrally disposed orifice 22 is formed in the piston 15, the edge 23 of the orifice being rounded as shown. In the space adjacent piston 15 and within the area enclosed by spiders 17 and 18, a section of piston rod 16 is removed to form open inner tubular ends, 24 and 25 and between these ends is positioned the main piston valve unit 26. This unit includes an annular valve head 27 having flat top and bottom surfaces 28 and 29 and a periphery formed of flat surfaces 31 and 32 symmetrically inclined to each other and approaching a rounded annular peak adjacent but displaced from the mid-edge of the curved inner surface 23 of piston aperture 22, so that, while an annular passageway always exists between spaces 19 and 21, the area of this passageway varies with the vertical movement of the valve head 27. Attached to the flat top surface 28 of valve head 27 is a cylindrical valve piston 33, the top end of which normally enters the end 24 of the main piston rod; and similarly cylindrical valve piston 34 is attached to the flat bottom surface 29 of the valve head 27, both cylindrical valve pistons 33 and 34 having sliding engagement with the adjacent piston rod ends 24 or 25 and each functioning as control chamber valves by being movable completely free of the piston rod ends on substantial axial displacement of the attached valve head 27.

A small piston head 35 is slidably mounted within the main piston rod 16 above the cylindrical valve piston 33 at a point clearing a bleed orifice 36 in the wall of piston rod 16; the space within piston rod 16 between cylindrical valve piston 33 and piston head 35 forming a control chamber 37. This bleed orifice provides for fluid communication between control chamber 37 and main cylinder space 21 through a passage 38 in the spider section 39 and a duct 41 through the main piston 15. The small piston head 35 is normally held adjacent the bleed orifice 36 by a spring 42, the spring ends being fixed to the small piston head 35 and to an inner plug member 43 inside the piston tube. A control chamber 44 is also formed between the cylindrical valve piston 34 and the small piston head 45, as held in the rod end 25 by plug member 46 and intervening coiled spring 47. Also, in the wall of the lower chamber 4, a bleed orifice 48 is formed communicating with main cylinder space 19 through spider conduit 49 and piston duct 51.

The shock absorber operates in the following manner, assuming a rapid vibratory type of disturbance imposed between the piston rod 16 and the main cylinder 14, filled with an incompressible fluid. To simplify explanation of the action consideration will be limited to a single disturbance with the piston rod 16 being driven upward with respect to the cylinder 14. As a consequence of this upward motion of the piston rod, the fluid in region 19 is compressed rapidly; and, since the pressure in region 21 remains low, the pressure difference across the outer bulge of valve head 27 causes this head to be driven downward, opening wide the orifice 22 and allowing free flow of fluid from region 19 into region 21. Accordingly, no appreciable load is allowed to be developed between piston rod 16 and cylinder 14. Thus, for high frequency pulses or vibrations, very little force is transmitted across the shock absorber. When the valve head 27 is forced downward, the fluid existing in control chamber 44, being incompressible in nature, transmits the motion from the cylindrical valve piston 34 to small piston head 45, compressing spring 47. As the load pulse drop off, the pressure in region 19 is again reduced, thus reducing the pressure difference across the valve head 27 and permitting the spring 47 to drive the valve head 27 upward to its equilibrium position.

Where the frequency of vibratory motion applied to the shock absorber is low, a different set of controls are effective. Assuming, as in the example of rapid vibratory movement, that the piston rod 16 is driven upward with respect to cylinder 14, but at a low rate of movement, pressure in region 19 is again increased so that fluid tends to flow from this region through orifice 22 into region 21. However, due to the slower pressure build-up in region 19, fluid may, also, flow from region 19 through passages 51, 49, and bleed orifice 48 into control chamber 44. This bleed flow is assumed to be rapid enough to increase the volume of fluid in chamber 44 to a material extent and thereby compress spring 47 by forcing small piston head 45 downward. The pressure in control chamber 44 thus increases at a fast enough rate to balance the downward force on the valve head 27 by an equal upward force on cylindrical valve piston 34, so that valve head 27 remains in its equilibrium position. As a consequence, the flow of fluid from main cylinder region 19 through orifice 22 in piston 15 is damped by the maintained restricted area of orifice 22 and force is transmitted across the shock absorber. The size of the piston area of cylindrical valve piston 34 for balance is, of course, determined by the fixed area relationship between these parts.

As the loading pulse drops off and, in effect, reverses, the pressure in region 21 increases with respect to that in region 19, so that upward pressure is applied to the valve head 27 as well as to the cylindrical valve piston 34 through expansion of spring 47. As valve head 27 opens, the piston surface of cylindrical valve piston 34 emerges from rod end 25, permitting a quick evacuation of fluid in control chamber 44 to region 21. In this manner, the absorber is recycled for another slow pulse in which piston rod 16 travels downward with respect to cylinder 14.

In the case of the low frequency pulse, as above described, with the valve head 27 moving upward in equilibrium with the main piston 15, if a high frequency upward pulse were imposed on piston rod 16, the pressure in region 19 would be momentarily increased above the low frequency pulse value existing at that time. Since fluid can flow only slowly from region 19 through passages 49, 51, and bleed orifice 48 into control chamber 44, the increase in pressure in control chamber 44 can not occur instantaneously, to balance the increased pressure difference across the outside bulge of valve head 27. Accordingly, valve head 27 would be driven downward during the existence of the high frequency pulse, to increase the opening of orifice 22 and prevent transmission of this high frequency pulse across the shock absorber. After the high frequency pulse passes, valve head 27 will again resume its equilibrium position for the existing low frequency pulse, in preparation for another high frequency pulse applied to the piston rod in either the upward or downward direction.

From the above description, it is apparent that the shock absorber has definite low pass characteristics, possesses automatic recycling characteristics for both low and high frequency oscillations or pulses, and can handle simultaneous application of both high and low frequency vibrations or pulses of either symmetrical or unsymmetrical nature. The absorber is also characterized by a small number of moving parts and the capacity for automatically dumping fluid in the control chambers to permit quick recycling for low frequency vibrations, even though these vibrations may be unsymmetrical. The shock absorber is so constructed as to function with equal facility in opposite directions of movement so that it may be readily employed in various machine uses. Also, the shock absorber is characterized by use of a main piston movable at slow or rapid rates in a cylinder filled with an incompressible fluid; there being in the piston a main orifice and between the piston and orifice a chamber containing an incompressible fluid provided with a bleed orifice adapted to supply fluid to the chamber only under conditions of relatively slow piston movement.

Obviously many modifications and variations of the present invention are possible in the light of the above teachings. It is therefore to be understood that within the scope of the appended claims the invention may be practiced otherwise than as specifically described.

What is claimed as new and desired to be secured by Letters Patent of the United States is:

1. A shock absorber adapted for connection between two relatively movable machine parts, comprising a hollow cylinder adapted to be filled with an incompressible fluid and connectable to one of said machine parts, a main piston slidably movable within said cylinder, said main piston dividing said cylinder into two regions and having a main orifice therein for passage of fluid between said regions, an elongate piston rod section slidably extending into said cylinder along an axis centrally positioned with respect to said main piston main orifice, the length of said piston rod section disposed externally of said cylinder being connectable to the other of said machine parts, the remaining length of said piston rod section having at least a tubular terminal portion and extending partially through one of said cylinder regions and terminating in an open end spaced from said main piston, said tubular terminal portion of said piston rod section defining a control chamber side wall, a piston head slidably movable within said tubular terminal portion of said piston rod section in a region spaced from said open end thereof defining a control chamber movable end wall, a control valve movably positioned in said main piston main orifice for controlling fluid flow therethrough, a cylindrical valve piston connected to said control valve and extending therefrom into said open end of said tubular terminal portion of said piston rod section when said control valve is equidistantly positioned between the opposed faces of said main piston thereby defining another control chamber movable end wall, a bleed orifice in said control chamber side wall for passage of fluid therethrough, a rigid tubular member having an end connected concentrically around said bleed orifice to said control chamber side wall and having another end connected to the adjacent face of said main piston, and a bleed orifice through said main piston communicable with the interior of said rigid tubular member, said rigid tubular member serving to maintain said piston rod section and said main piston in fixed relation and providing for fluid communication between said control chamber and the other of said cylinder regions.

2. The shock absorber as defined in claim 1, said control chamber bleed orifice proportioned to normally prevent material inflow of fluid to said control chamber during a relatively rapid loading pulse yet permitting material fluid inflow during a relatively slow loading pulse, whereby the flow of fluid through said main piston main orifice is controlled.

3. The shock absorber as defined in claim 2, wherein said first named control chamber end wall is positioned adjacent a spring tending to resist movement of said first named end wall away from said main piston.

4. The shock absorber as defined in claim 1 including a second control chamber positioned in the other of said cylinder regions, said second control chamber comprising a tubular section extending along an axis centrally positioned with respect to said main piston main orifice and defining a control chamber side wall, said second control chamber having an open end spaced from said main piston, a piston head slidably movable within said second control chamber tubular section in a region spaced from said open end thereof defining a movable end wall for said second control chamber, a second cylindrical valve piston connected to said control valve and extending therefrom into said open end of said second control chamber tubular section when said control valve is equidistantly positioned between the opposed faces of said main piston thereby defining another movable end wall for said second control chamber, a bleed orifice in said second control chamber side wall for passage of fluid therethrough, and a rigid tubular member having an end connected concentrically around said bleed orifice to said second control chamber side wall and having another end connected to the adjacent face of said main piston concentrically around a second bleed orifice therethrough.

5. The shock absorber as defined in claim 4, each of said control chamber bleed orifices being proportioned to normally prevent material inflow of fluid to said control chambers during a relatively rapid loading pulse yet permitting material fluid inflow during a relatively slow loading pulse, whereby the flow of fluid through said main piston main orifice is controlled.

6. The shock absorber as defined in claim 5, wherein said control chamber end wall of each of said control chambers most remotely spaced from said main piston is positioned adjacent a spring tending to resist movement of said adjacent end wall away from said main piston.

References Cited in the file of this patent
UNITED STATES PATENTS

| | | |
|---|---|---|
| 2,161,811 | Grebe | June 13, 1939 |
| 2,716,470 | Focht | Aug. 30, 1955 |
| 2,886,142 | Orshansky | May 12, 1959 |
| 2,914,143 | Focht | Nov. 24, 1959 |